United States Patent [19]
Sato et al.

[11] Patent Number: 5,349,478
[45] Date of Patent: Sep. 20, 1994

[54] MAGNETIC RECORDING AND/OR REPRODUCING METHOD HAVING A DOUBLE AZIMUTH HEAD ARRANGEMENT

[75] Inventors: Kenichi Sato; Kazunobu Chiba, both of Miyagi, Japan

[73] Assignee: Sony Corporation, Tokyo, Japan

[21] Appl. No.: 32,015

[22] Filed: Mar. 16, 1993

[30] Foreign Application Priority Data

Mar. 31, 1992 [JP] Japan ................................ 4-105368

[51] Int. Cl.$^5$ .............................................. G11B 5/02
[52] U.S. Cl. ...................................................... 360/55
[58] Field of Search .................... 360/119, 121, 55, 64, 360/76, 31

[56] References Cited

U.S. PATENT DOCUMENTS 3,925,816  12/1975  Kihara ................................ 360/19.1

FOREIGN PATENT DOCUMENTS 0229732  7/1987  European Pat. Off. .
2009995  6/1979  United Kingdom .
2070841  9/1981  United Kingdom .

OTHER PUBLICATIONS

Patent Abstracts of Japan, vol. 10, No. 279 (E–439) Sep. 20, 1986 Atsuo et al. Magnetic Recording and Reproducing Device.
Patent Abstracts of Japan, vol. 12, No. 314 (E–649) Aug. 25, 1988 Hiromichi, Magnetic Recording and Reproducing Device.

*Primary Examiner*—Andrew L. Sniezek
*Attorney, Agent, or Firm*—William S. Frommer; Alvin Sinderbrand

[57] ABSTRACT

A magnetic recording and reproducing method for enhancing picture quality and other characteristics while suppressing the difference in reproduction output between two heads. The method involves using a double azimuth head arrangement for signal recording and reproduction by helical scan. The two heads A and B are provided so that their azimuth angles $\theta_A$ and $\theta_B$ do not coincide with each other. The actual recording direction represented by the sum of the azimuth angles $\theta_A$ and $\theta_B$ on the one hand and a still angle $\alpha$ between the heads A and B on the other is made as close to the direction of magnetic particle orientation on the magnetic recording medium as possible.

7 Claims, 7 Drawing Sheets

MAGNETIC RECORDING AND/OR REPRODUCING METHOD HAVING A DOUBLE AZIMUTH HEAD ARRANGEMENT

BACKGROUND OF THE INVENTION

1. Field of the Invention

The present invention relates to a magnetic recording and reproducing method for recording and reproducing signals by helical scan with a double azimuth head arrangement in such devices as 8-mm VTR's (video tape recorders) and R-DAT's (digital audio tape recorders).

2. Description of the Prior Art

With magnetic recording systems that use magnetic tapes as their recording medium, the so-called helical scan method is gradually replacing the conventional longitudinal recording method whereby signals are recorded by a fixed head onto the magnetic tape in its longitudinal direction. The helical scan method, designed to meet today's demand for recording in ever-higher density, involves recording signals obliquely relative to the longitudinal direction of the tape by use of a head attached to a rotating drum. The helical scan method is attracting attention for its potential application in business-use notebook-size recorders.

To attain higher recording density in a helical scan setup requires increasing the recording track density. That is, signals are to be recorded onto contiguous tracks that are as close to one other as possible. However, too narrow a pitch between recording tracks can eliminate what is known as the guard band between these contiguous tracks. This may cause the head to pick up signals not only from the current track but also from the adjacent recording track. The phenomenon, called cross talk, hampers signal detection for high quality reproduction.

One prior art method proposed to prevent cross talk is as follows: two heads (A and B) are attached to the rotating drum. These heads are mounted so that they have a predetermined angle each relative to a reference line, one angle having the opposite polarity of the other (e.g., $+\theta$ and $-\theta$, a counterclockwise and a clockwise angle respectively relative to the reference line). Where signals are recorded by use of the rotating drum having the two heads A and B with different mounting angles, the two heads scan the tape alternately. The gap direction of the heads A and B (i.e., vector of the gap magnetic field) is inclined relative to the scanning direction thereof. The signals are recorded onto recording tracks at the azimuth angle formed by the two heads A and B.

With the signals thus recorded onto recording tracks at the azimuth angle of the two heads A and B, it is possible practically to prevent, during reproduction, one head from detecting the signal magnetic field from the recording track of the other head. The scheme is supposed to offer normally reproduced signals with no cross talk.

The helical scan-based systems use as their magnetic recording medium the so-called evaporated or coated type magnetic tapes. The evaporated tape is constituted by a base film, made illustratively of polyethylene terephtalate, coated with a magnetic layer. The magnetic layer comprises a metal or alloy magnetic substance (e.g., Co-Ni alloy) deposited direct onto the base film by plating or by known vacuum thin film forming techniques (e.g., vacuum evaporation, sputtering, ion plating). On the other hand, the coated magnetic tape is produced by applying a coating material on a base film, the coating material constituting the magnetic layer. The coating material is made from needle magnetic particles dispensed in a binder composed of an organic polymeric material. The needle magnetic particles include Co-clad gamma-ferrite magnetic particles or ferromagnetic particles (called metal magnetic particles) constituting a surface oxide layer.

A deficiency has been experienced where signals are recorded to and reproduced from the above recording medium by helical scan with the double azimuth head. That is, there occurs a difference in reproduced output between the heads A and B, causing the picture quality and other characteristics to deteriorate. This is attributable to the gap direction of one head being different from that of the other head relative to the longitudinal direction of the tape in which magnetic particles are generally oriented; the particles constitute the magnetic layer of the recording medium.

The cross talk phenomenon is prevented effectively by enlarging the difference in the gap direction tilt angle (i.e., azimuth angle) of each head relative to the longitudinal recording tracks on the tape. However, the greater the difference in azimuth angle, the greater the gap direction difference between the heads A and B relative to the direction in which the magnetic particles are oriented. This leads to further deterioration of characteristics.

SUMMARY OF THE INVENTION

It is therefore an object of the present invention to provide a magnetic recording and reproducing method for minimizing the difference in reproduced output between two heads so as to improve the picture quality and other characteristics.

In carrying out the invention and according to one aspect thereof, there is provided a magnetic recording and reproducing method for recording and reproducing signals by helical scan with a double azimuth head arrangement containing two heads, one of the two heads having an azimuth angle of $\theta_A$ and the other having an azimuth angle of $\theta_B$, wherein $$|\theta_A| \neq |\theta_B|$$

The magnetic recording medium for use with systems to which the invention applies includes the so-called evaporated type magnetic recording tapes. The magnetic tapes of this kind are made of a non-magnetic supporting structure covered with a ferromagnetic metal thin film deposited by known vacuum thin film forming techniques.

The non-magnetic supporting structure constituting part of the above magnetic recording medium may be any of the materials currently used for this recording medium: polyesters such as polyethylene terephtalate; polyolefins such as polyethylene and polypropylene; cellulose derivatives such as cellulose triacetate, cellulose diacetate and cellulose acetate butyrate; vinyl resins such as polyvinylidene chloride; and polymeric materials made from plastic materials such as polyimide, polyamide and polycarbonate. The non-magnetic supporting structure may have its surface treated so as to develop fine bumps that are conducive to better control of the surface properties.

The magnetic material for constituting the magnetic layer over the supporting structure may be any of known magnetic materials. Such materials include, and are not limited to, magnetic metals such as Fe, Co and Ni, as well as Fe-Co, Co-Ni, Fe-Co-Ni, Fe-Co-Cr, Co-Ni-Cr and Fe-Co-Ni-Cr.

With the appropriate magnetic material selected, it is formed into a metal magnetic thin film that serves as the magnetic layer. The metal magnetic thin film is formed by any of such known vacuum thin film forming techniques as evaporation, sputtering and ion plating.

The most commonly used technique for producing the metal magnetic thin film is oblique evaporation. The oblique evaporation technique involves moving a non-magnetic supporting structure in a predetermined direction relative to the circumference of a cooling can, the surface of the magnetic supporting structure being subjected to a flow of vapor (of the evaporated magnetic material coming from an evaporation source). The incident angle of the vapor flow with respect to the surface of the non-magnetic supporting structure is preferably 40 degrees or more. If the incident angle of the vapor flow is less than 40 degrees, too many vertical components result in the produced film and deteriorate the magnetic property within the surface.

Systems to which this invention applies may alternatively utilize the so-called coated type magnetic recording tapes. The magnetic tapes of this kind are made of a non-magnetic supporting structure coated with a magnetic paint that serves as the magnetic layer. In this case, too, the non-magnetic supporting structure may be composed of, but not limited to, the same materials as those for use with the evaporated type magnetic recording tapes.

The magnetic layer covering the non-magnetic supporting structure is constituted by a coat of the magnetic paint made from magnetic powder dispersed in a resin binder. The magnetic powder and the resin binder may be any of the currently available types but are not limited thereto.

Illustratively, the magnetic powder may be composed of needle crystal magnetic particles such as ferromagnetic iron oxide particles, ferromagnetic chromium dioxide particles, ferromagnetic alloy particles and iron nitride particles. The ferromagnetic iron particles may be any of the types expressed by the general formula of $FeO_x$ where, x falls within the range of $1.33 \leq x \leq 1.50$ These kinds of ferromagnetic iron particles include maghemite ($\gamma Fe_2O_3$, x=1.50), magnetite ($Fe_3O_4$, x=1.33) and their solid solutions ($FeO_x$, $1.33 < x < 1.50$). Copper (Co) may be added to these ferromagnetic iron oxide particles for coercive force enhancement. Copper-loaded organic iron comes broadly in two kinds: doped type and coated type.

The particles of ferromagnetic chromium dioxide ($CrO_2$) may be loaded with at least one of such materials as Ru, Sn, Te, Sb, Fe, Ti, V and Mn for coercive force enhancement. Ferromagnetic alloy powder may be made from any of Fe, Co, Ni, Fe-Co, Fe-Ni, Fe-Co-Ni, Co-Ni, Fe-Co-B, Fe-Co-Cr-B, Mn-Br, Mn-Al, and Fe-Co-V. These alloys may be loaded with any of such metal components as Al, Si, Ti, Cr, Mn, Cu and Zn so as to improve various properties.

The resin binder may be any of such polymers as vinyl chloride, vinyl acetate, vinyl alcohol, vinylidene chloride, acrylic ester, methacrylate ester, styrene, butadiene and acrylonitrile; copolymers that combine two or more of the above polymers; as well as polyurethane resin, polyester resin, epoxy resin, and cellulose derivatives. A hydrophilic polar group such as carboxyl group, sulfonic group, sulfate group and phosphate ester group may be introduced into the resin binder so as to better disperse the magnetic particles therewithin.

The magnetic recording medium thus produced is in tape form. The magnetic particles constituting the magnetic layer are arranged in the longitudinal direction of the tape.

In the conventional setup where the above magnetic recording tape is subjected to signal recording and reproduction by helical scan, the two heads A and B attached to the rotating head have azimuth angles $\theta_A$ and $\theta_B$ of the opposite polarities (e.g., $\theta_A = +20°$, $\theta_B 32 -20°$). In this case, the gap direction of one head with respect to the magnetic particle orientation on the tape is different from the gap direction of the other head. This causes a difference to occur in reproduction output between the heads A and B, thereby deteriorating reproduction characteristics.

By contrast, according to the present invention, the azimuth angles $\theta_A$ and $\theta_B$ differ from each other ($=\theta_A| \neq |\theta_B|$). The azimuth angle difference makes it possible to circumvent the reproduction output difference between the heads as experienced with the prior art.

The azimuth angles $\theta_A$ and $\theta_B$ are angles formed in the gap direction by the heads A and B relative to their scanning direction during recording or reproduction. A positive (+) and a negative (−) azimuth angle occur in the counterclockwise and clockwise directions, respectively, with reference to the scanning direction of the two heads A and B.

Where the azimuth angles are made different ($|\theta_A| \neq |\theta_B|$), a sufficiently high reproduction output is difficult to obtain if the gap directions of the two heads A and B are 180 degrees different. Given that restriction, the azimuth angles $|\theta_A|$ and $|\theta_B|$ should preferably be 30 degrees or less each in order to suppress the difference in reproduction output between the two heads and to obtain the highest possible reproduction output. The azimuth angles $\theta_A$ and $\theta_B$ may be established as required by simply selecting appropriate mounting angles of the heads A and B.

As mentioned, the reproduction output from the heads A and B relies for its magnitude on the angle between the signal recording direction of the heads and the direction of the magnetic particle orientation over the magnetic recording medium. That is, the reproduction output decreases as the divergence of the signal recording direction from the direction of the magnetic particle orientation over the recording medium increases.

To determine the signal recording direction requires considering the scanning direction of the heads A and B in addition to their azimuth angles $\theta_A$ and $\theta_B$. If $\alpha$ represents the angle (still angle) between the longitudinal direction of the magnetic recording medium and the scanning direction of the heads A and B, then the actual direction of signal recording by each of the heads A and B relative to the longitudinal direction of the recording medium is given as the sum of the still angle $\alpha$ and the azimuth angles $\theta_A$ and $\theta_B$.

Suppose that the sums of the still angle $\alpha$ and the azimuth angles $\theta_A$ and $\theta_B$ for the two heads A and B ($|\alpha+|\theta_A||$ and $|\alpha-|\theta_B||$) are replaced with recording angles $\beta_A$ and $\beta_B$, respectively. In that case, the difference in reproduction output between the two heads A and B is minimized by setting the recording angles $\beta_A$ and $\beta_B$ to 30 degrees or less each. That setting of the recording angles makes the actual signal recording direction of the heads A and B substantially the same as the direction of the magnetic particle orientation over the magnetic recording medium. This suppresses the difference in reproduction output between the heads A and B and thereby prevents the deterioration of picture quality and other characteristics.

In the conventional setup, the azimuth angles of the two heads attached to the rotating head coincide with each other for signal recording by helical scan onto the magnetic recording medium. In this case, the two heads develop a difference therebetween in reproduction output because of their gap direction discrepancy relative to the direction of the magnetic particle orientation over the recording medium. The problem is solved, according to the invention, by establishing two different azimuth angles $\theta_A$ and $\theta_B$ for the two heads A and B.

The direction of signal recording by each of the heads A and B relative to the longitudinal direction of the magnetic recording medium is determined by the sum of the still angle $\alpha$ and the azimuth angles $\theta_A$ and $\theta_B$, the still angle being formed between the longitudinal direction of the magnetic recording medium and the scanning direction of the heads A and B. When ($|\alpha+|\theta_A||$ and $|\alpha-|\theta_B||$) are each set to 30 degrees or less, the actual signal recording direction of the heads A and B is made substantially the same as the direction of the magnetic particle orientation over the magnetic recording medium. This setting inhibits the difference in reproduction output between the heads A and B.

These and other objects, features and advantages of the invention will become more apparent from a reading of the following description and appended drawings.

DESCRIPTION OF THE PREFERRED EMBODIMENT

Figure 1:
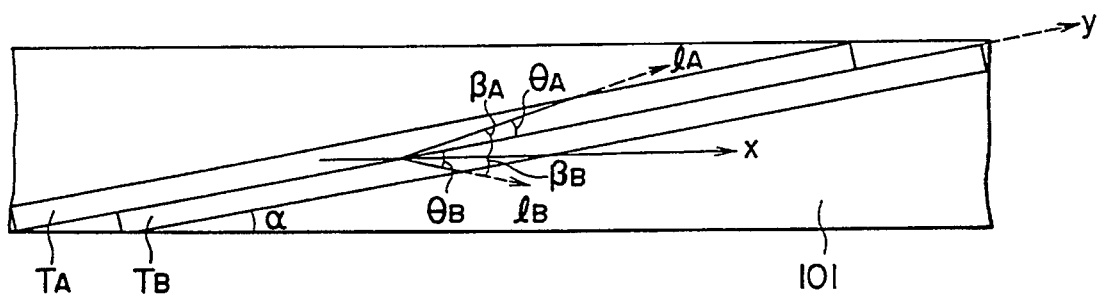
FIG. 1 is a schematic view showing how tracks are recorded by a double azimuth head arrangement having two heads of different mounting angles in connection with the invention.

One preferred embodiment of the invention will now be described with reference to the accompanying drawings. The embodiment will be highlighted in particular as to how recordings are made on the magnetic recording medium. FIG. 1 shows schematically how tracks are recorded by a double azimuth head arrangement having two heads of different mounting angles. The tracks accommodate signals recorded by helical scan on an evaporated type magnetic tape with its axis of easy magnetization positioned in the longitudinal direction.

As illustrated in FIG. 1, the signal recording operation by helical scan over the magnetic tape 101 involves causing the heads A and B to scan the tape obliquely relative to the longitudinal direction x of the tape. The extended direction of recorded tracks $T_A$ and $T_B$ by the heads A and B forms an angle $\alpha$ with respect to the longitudinal direction x of the tape (called the still angle). Signals are recorded onto the tracks $T_A$ and $T_B$ at azimuth angles $\theta_A$ and $\theta_B$ depending on the mounting angles of the heads A and B.

The signal recording directions $\psi_A$ and $\psi_B$ of the heads A and B relative to the longitudinal direction x of the tape are each given as the sum of the azimuth angles $\theta_A$ and $\theta_B$ and the still angle $\alpha$ ($|\alpha+|\theta_A||$, and $|\alpha|\theta_B||$). With this embodiment of the invention, signals are recorded so that the angles of the signal recording directions $\psi_A$ and $\psi_B$ relative to the longitudinal direction x of the tape (i.e., recording angles $\beta_A$ and $\beta_B$) coincide with each other. This suppresses the difference in reproduction output between the heads A and B and thereby improves picture quality and other characteristics.

Figure 2:
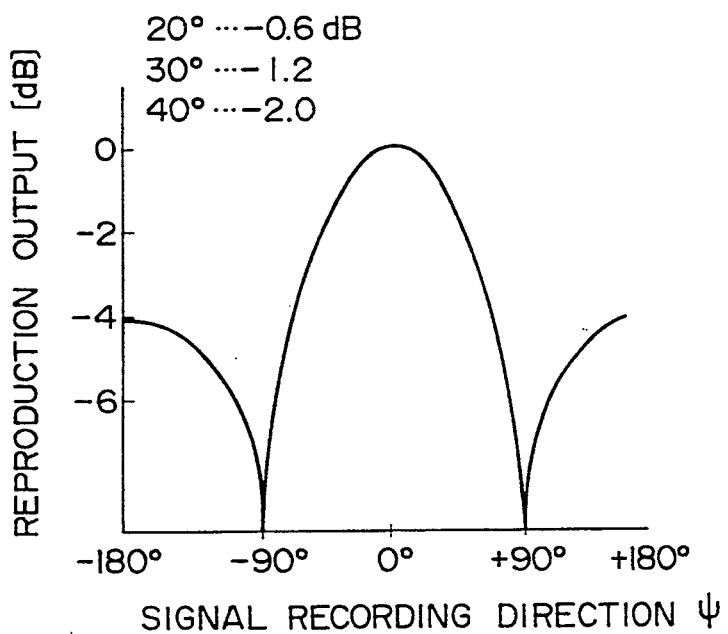
FIG. 2 is a view of a typical relationship between signal recording direction $\psi$ and reproduction output with the longitudinal direction of the magnetic tape taken as the reference in connection with the invention.

FIG. 2 depicts a typical relationship between signal recording direction $\psi$ and reproduction output. In FIG. 2, positive (+) and negative (−) angles occur counterclockwise and clockwise relative to the longitudinal direction x of the tape, respectively. As illustrated in FIG. 2, the reproduction output is maximized when the recording direction $\psi$ coincides with the longitudinal direction x of the tape, i.e., with the direction of the magnetic particle orientation on the magnetic tape. On the other hand, the reproduction output degenerates as the angle between recording direction $\psi$ and longitudinal direction x of the tape becomes closer to 90 degrees. It is thus clear that to ensure a high reproduction output requires making the recording direction $\psi$ as close to the axis of easy magnetization of the magnetic tape as possible.

As shown in FIG. 2, an output deterioration of 4 dB is observed when the recording direction $\psi$ has an angle of 180 degrees relative to the longitudinal direction x of the tape. This is because the axis of easy magnetization of the magnetic tape exists not only in the longitudinal direction thereof but also in the direction of the film thickness at a certain angle relative to the surface.

The inventor examined the effects of tilted axes of easy magnetization relative to the film thickness using various magnetic tapes with their axes of easy magnetization set in different directions. For examination, signals were first recorded on the magnetic tapes so that the recording direction ψ would become 20 degrees. The tapes thus obtained were checked for reproduction output at a wavelength of 0.5 μm. The azimuth angle was set to zero (reproduction output was set to 0 dB for the signals recorded in the usual longitudinal direction). It was then observed that the reproduction output was −0.7 dB, −0.5 dB and −0.4 dB with magnetic tapes having the axis of easy magnetization in the film thickness direction at angles of 10, 30 and 50 degrees relative to the surface, respectively. Since the deterioration of reproduction output was reduced as the tilt of the axis of easy magnetization was increased in the film thickness direction, the effects of the invention may be said to be significant when it is applied to magnetic tapes with their axis of easy magnetization set at 30±20 degrees relative to the tape surface.

On the basis of the above findings, the inventor then proceeded to consider conditions for obtaining good reproduction output characteristics while suppressing the difference in reproduction output between the two heads mounted on the double azimuth head arrangement.

EXPERIMENT 1:

This experiment utilized an evaporated type magnetic tape with its magnetic layer deposited by known oblique evaporation techniques. The axis of easy magnetization of the magnetic tape was positioned in the longitudinal direction of the tape and tilted at about 30 degrees relative to the surface. The azimuth angles $\theta_A$ and $\theta_B$ and still angle $\alpha$ of the heads A and B were varied for recording and reproduction by helical scan. With the recording angles $\beta_A$ and $\beta_B$ switched to different values, the magnetic tape was checked for reproduction output. The results are shown in Table 1 below. For reproduction, an 8-mm VTR equipped with a rotating head 40 mm in outer diameter was used. The recording wavelength was set to 0.5 μm and cross talk to 1.0 μm. In Table 1, the reproduction output values are relative values with reference to 0 dB obtained with the recording angle $\beta_B$ made to coincide with the longitudinal direction of the tape (by use of comparative example 2, to be described later).

heads A and B is 1 dB or less which is a practically acceptable deterioration level.

Meanwhile, where the recording angles $\beta_A$ and $\beta_B$ exceeded 30 degrees each (as with comparative example 1), an appreciable deterioration in reproduction output was observed. Even where the recording angles $\beta_A$ and $\beta_B$ fell within the range stipulated by the invention, a coincidence in absolute value between the azimuth angles $\theta_A$ and $\theta_B$ (as with comparative examples 2 and 3) resulted in significant differences in reproduction output between the heads A and B. These results were generally unsatisfactory from a performance point of view.

The above-mentioned magnetic recording and reproducing method according to the invention provides excellent results (e.g., enhanced picture quality) when applied to systems such as the one described below.

A. Recording and Reproducing System Typically Configured Today, the digital VTR (video tape recorder) for recording the color video signal in digital format to the recording medium (magnetic tape, etc.) comes in two types: component type digital VTR of the D1 format and composite type digital VTR of the D2 format, both for use by broadcasting stations.

The D1 format digital VTR is a system that converts the luminance signal, first color difference signal and second color difference signal at sampling frequencies of 13.5 MHz, 6.75 MHz and 6.75 MHz, respectively, from analog to digital format and subjects the converted signals to appropriate signal processing for recording onto the magnetic tape. Since the ratio of the sampling frequencies for the three signal components is 4 to 2 to 2, this VTR is also called a 4:2:2 system.

The D2 format digital VTR is a system that converts from analog to digital format the composite color video signal at a sampling frequency four times the frequency of the color subcarrier signal and subjects the converted signal to suitable signal processing for recording onto the magnetic tape.

Because these two kinds of digital VTR's are designed primarily for use by broadcasting stations, the systems emphasize picture quality as their top priority in performance. For recording with such systems, the color video signal is converted from analog to digital format typically in eight bits per sample with no substantial signal compression. This means that a maximum

TABLE 1

| | Still Angle $\alpha$ (°) | Azimuth angle $\theta$ (°) | | Recording angle $\beta$ (°) | | Reproduction output (dB) | | Reproduction output difference between heads A and B (dB) | Cross talk (dB) |
|---|---|---|---|---|---|---|---|---|---|
| | | $\theta_A$ | $\theta_D$ | $\beta_A$ | $\beta_D$ | A | B | | |
| Example 1 | 10 | +5 | −15 | +15 | −5 | −0.6 | −0.2 | 0.4 | −32 |
| Example 2 | 10 | 0 | −20 | +10 | −10 | −0.3 | −0.3 | 0 | −29 |
| Example 3 | 5 | +7 | −15 | +12 | −10 | −0.5 | −0.4 | 0.1 | −30 |
| Example 4 | 10 | +18 | −30 | +28 | −20 | −0.9 | −0.6 | 0.3 | −45 |
| Comparative Example 1 | 10 | +25 | −42 | +35 | −32 | −1.6 | −1.4 | 0.2 | −46 |
| Comparative Example 2 | 10 | +10 | −10 | +20 | 0 | −0.7 | 0 | 0.7 | −28 |
| Comparative Example 3 | 5 | +10 | −10 | +15 | −5 | −0.7 | −0.1 | 0.6 | −28 |

As indicated in Table 1, where the azimuth angles $\theta_A$ and $\theta_B$ and still angle $\alpha$ of the heads A and B are established so that the recording angles $\beta_A$ and $\beta_B$ are each set to 30 degrees or less, the reproduction output difference between the heads A and B is reduced to 0.5 dB or less, and the reproduction output deterioration of the size cassette tape loaded in, say, the D1 format digital VTR provides only about 1.5 hours of reproduction time. That reproduction time is not sufficient for household use.

With this embodiment of the invention, signals with a minimum wavelength of 0.5 μm are recorded illustratively onto tracks 5 μm wide each. This amounts to a recording density of at least $8 \times 10^5$ bits/mm². In combination with techniques for compressing recorded data in a way that minimizes reproduction distortion, the embodiment may constitute a digital VTR that uses magnetic tapes 8 mm or less in width for long-hour recording and reproduction. How this digital VTR is configured will now be described.

a. Signal Processing Section

Figure 3:
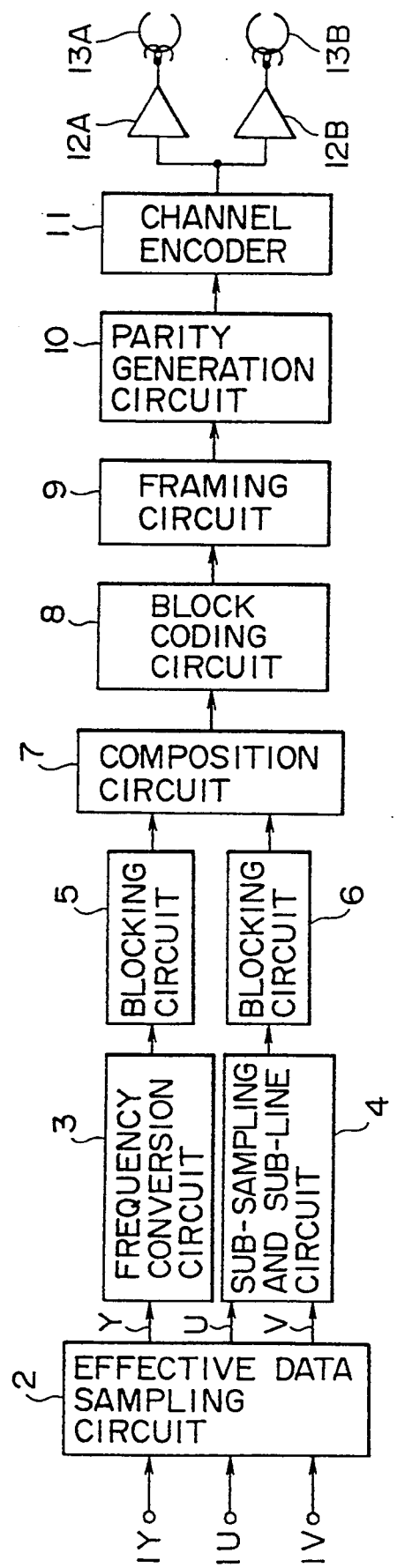
FIG. 3 is a block diagram depicting a typical structure of the recording side of the signal processing section in a digital VTR embodying the invention, whereby the digital picture signal is compressed and recorded in such a manner as to ensure subsequent signal reproduction with minimum distortion.

The signal processing section of the digital VTR comprising the embodiment is described first. FIG. 3 is a block diagram showing the entire structure of the recording side of the signal processing section in the digital VTR. A digital luminance signal Y and digital color difference signals U and V are prepared from three primary color signals (red, green, blue) coming illustratively from a color video camera. These signals Y, U and V are fed to input terminals 1Y, 1U and 1V. In this case, the clock rates of the three signals coincide with the frequencies of the component signals for the D1 format system. That is, the sampling frequencies are 13.5 MHz for the luminance Signal Y and 6.75 MHz for the color difference signals U and V. The bit count per sample is eight bits. Thus the quantity of signal data fed to the input terminals 1Y, 1U ad 1V is about 216 Mbps. An effective data sampling circuit 2 shown in FIG. 3 discards the blanking time data from the whole data fed to the input terminals in order to acquire those data in the effective region alone, whereby the data quantity is compressed to about 167 Mbps.

Of the output from the effective data sampling circuit 2, the luminance signal Y is supplied to a frequency conversion circuit 3. The frequency conversion circuit 3 reduces the sampling frequency of the luminance signal Y from 13.5 MHz to a three-fourths thereof. The circuit 3 may illustratively be a thin-out filter that eliminates aliasing noise. The output signal of the frequency conversion circuit 3 is sent to a blocking circuit 5 which converts the sequence of the luminance data to a block sequence. The blocking circuit 5 is provided preparatory to the processing by a block coding circuit 8.

Figure 5:
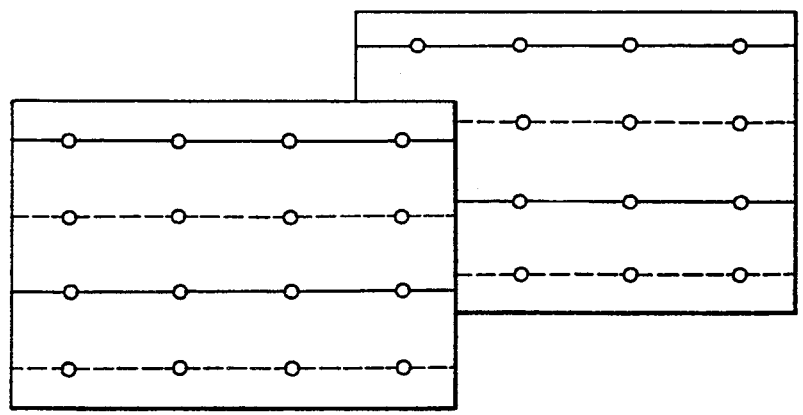
FIG. 5 is a view sketching a typical block for block coding in connection with the invention.

FIG. 5 is a view sketching the structure of a block that serves as the coding unit. This typical block is a three-dimensional block representing a picture illustratively made of two frames. Numerous blocks (4 lines $\times$ 4 pixels $\times$ 2 frames each) are formed as blocking units. In FIG. 5, solid lines represent odd-numbered field lines and broken lines denote even-numbered field lines.

Figure 6:
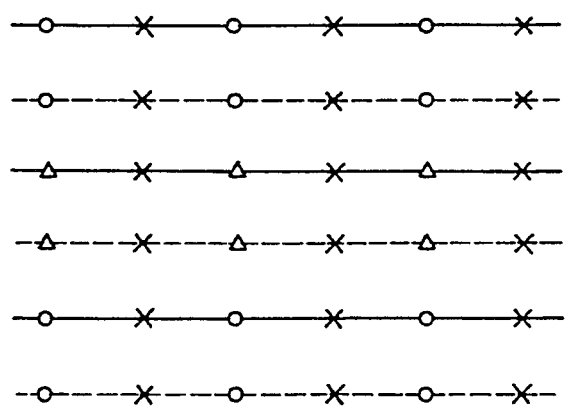
FIG. 6 is a view used to describe the sub-sampling and sub-line process in connection with the invention.

Of the output from the effective data sampling circuit 2, the two color difference signals U and V are fed to a sub-sampling and sub-line circuit 4. The circuit 4 reduces the sampling frequency of 6.75 MHz to its half for the respective signals. Thereafter, the two digital color difference signals are selected alternately per line and are composed into single channel data. In this manner, the sub-sampling and sub-line circuit 4 provides a linearly sequenced digital color difference signal. FIG. 6 is a view sketching a typical pixel composition of the signal that was sub-sampled and sub-lined by the sub-sampling and sub-line circuit 4. In FIG. 6, circles (○) represent the sub-sampled pixels of the first color difference signal U, triangles (Δ) denote the sampled pixels of the second color difference signal V, and crosses (x) stand for the positions of the pixels thinned out by sub-sampling.

The linearly sequenced signal output by the sub-sampling and sub-line circuit 4 is sent to a blocking circuit 6. As with the other blocking circuit 5, the circuit 6 converts the color difference data of the television signal from scanned sequence to blocking sequence. In the same manner as the blocking circuit 5, the blocking circuit 6 converts the color difference data into a block structure of 4 lines $\times$ 4 pixels $\times$ 4 frames per block. The signals output by the blocking circuits 5 and 6 are fed to a composition circuit 7.

The composition circuit 7 converts the block-sequenced luminance and color difference signals into single-channel data. The output signal of the composition circuit 7 is sent to the block coding circuit 8. The block coding circuit 8 may illustratively be an ADRC (adaptive dynamic range coding) encoder, a DCT (discrete cosine transform) circuit or the like. The ADRC encoder provides coding that is adapted to the dynamic range of each block, as will be described later. The output signal of the block coding circuit 8 is supplied to a framing circuit 9 for conversion to frame structure data. The framing circuit 9 provides switchover between pixel-related clock and recording-related clock.

The output signal of the framing circuit 9 is fed to a parity generation circuit 10 that generates a parity check code for error correction. The output signal of the parity generation circuit 10 is supplied to a channel encoder 11. The channel encoder 11 performs channel coding in such a manner that reduces the low-frequency portion of the recording data. The output signal of the channel encoder 11 is sent to a pair of magnetic heads 13A and 13B through recording amplifiers 12A and 13A as well as through a rotating transformer, not shown. The magnetic heads 13A and 13B record the signal onto the magnetic tape. The audio signal and the video signal are compressed and coded separately before being fed to the channel encoder 11.

The above-described signal processing involving the sampling of effective data alone reduces the input data quantity of 216 Mbps to about 167 Mbps. The data quantity is further lowered to 84 Mbps by frequency conversion and by the sub-sampling and sub-line process. The resulting data are compressed and coded by the block coding circuit 8 to about 25 Mbps. When additional data such as parity and audio signal data are included, the final quantity of recording data amounts to 31.56 Mbps.

Figure 4:
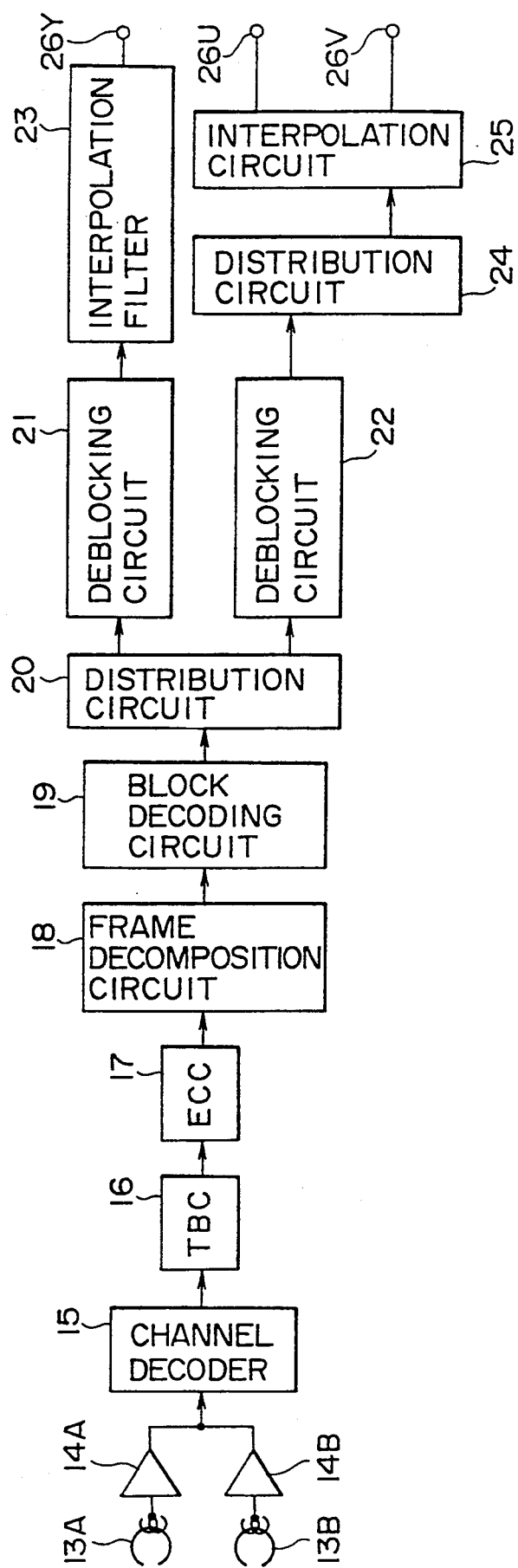
FIG. 4 is a block diagram illustrating a typical structure of the reproduction side of the signal processing section in the digital VTR.

How the reproduction side of the signal processing section in the digital VTR is configured will now be described with reference to FIG. 4. As illustrated in FIG. 4, the signal reproduction operation is started with the magnetic heads 13A and 13B sending reproduced data to a channel decoder 15 through a rotating transformer and reproducing amplifiers 14A and 14B. The channel decoder 15 decodes the coded channel data. The output signal of the channel decoder 15 is supplied to a TBC (time base corrector) circuit 16. The TBC circuit 16 removes the time base-varied component from the reproduced signal. The reproduced data from the TBC circuit 16 are fed to an ECC circuit 17 for error correction by use of an error correcting code. The output signal of the ECC circuit 17 is sent to a frame decomposition circuit 18.

The frame decomposition circuit 18 separates the components of the block coded data and provides switchover between recording-related clock and pixel-related clock. The data components separated by the frame decomposition circuit 18 are supplied to a block decoding circuit 19 which, through decoding, provides restored data corresponding to the original data for each block. The decoded data from the block decoding circuit 19 are fed to a distribution circuit 20. The distribution circuit 20 separates the decoded data into the luminance signal and color difference signal. The luminance signal is sent to a deblocking circuit 21 and the color difference signal to a deblocking circuit 22. In turn, the deblocking circuits 21 and 22 convert the decoded data from blocking sequence to raster scan sequence by reversing the order of conversion effected by the blocking circuits 5 and 6 on the transmitting side.

The decoded luminance signal from the deblocking circuit 21 is supplied to an interpolation filter 23. The interpolation filter 23 converts the sampling rate of the luminance signal from 3 fs to 4 fs (4 fs=13.5 MHz). The digital luminance signal Y from the interpolation filter 23 is sent to an output terminal 26Y.

Meanwhile, when the digital color difference signal from the deblocking circuit 22 is supplied to the distribution circuit 24, the circuit 24 divides the signal from the linearly sequenced digital color difference signal format into digital color difference signals U and V. The digital color difference signals U and V from the distribution circuit 24 are fed to an interpolation circuit 25 for signal interpolation. The interpolation circuit 25 interpolates the thinned-out line and pixel data using the restored pixel data. The interpolation circuit 25 thus provides the digital color difference signals U and V at a sampling rate of 2 fs, These signals U and V are sent to output terminals 26U and 26V, respectively.

b. Block Coding Section

The block coding circuit 8 in FIG. 3 is an ADRC (adaptive dynamic range coding) encoder. In operation, this ADRC encoder detects from each block a maximum value MAX and a minimum value MIN of a plurality of pixel data, finds the dynamic range of the block based on the detected maximum and minimum values MAX and MIN, encodes the block in a way adapted to the dynamic range DR, and provides requantization using a bit count lower than the number of bits in the original pixel data. Alternatively, the block coding circuit 8 may be a DCT (discrete cosine transform) circuit. The DCT circuit subjects the pixel data of each block to the DCT process to obtain coefficient data, quantizes the coefficient data thus gained, and puts the quantized data to a run-length-Huffman coding process for compressed coding.

Figure 7:
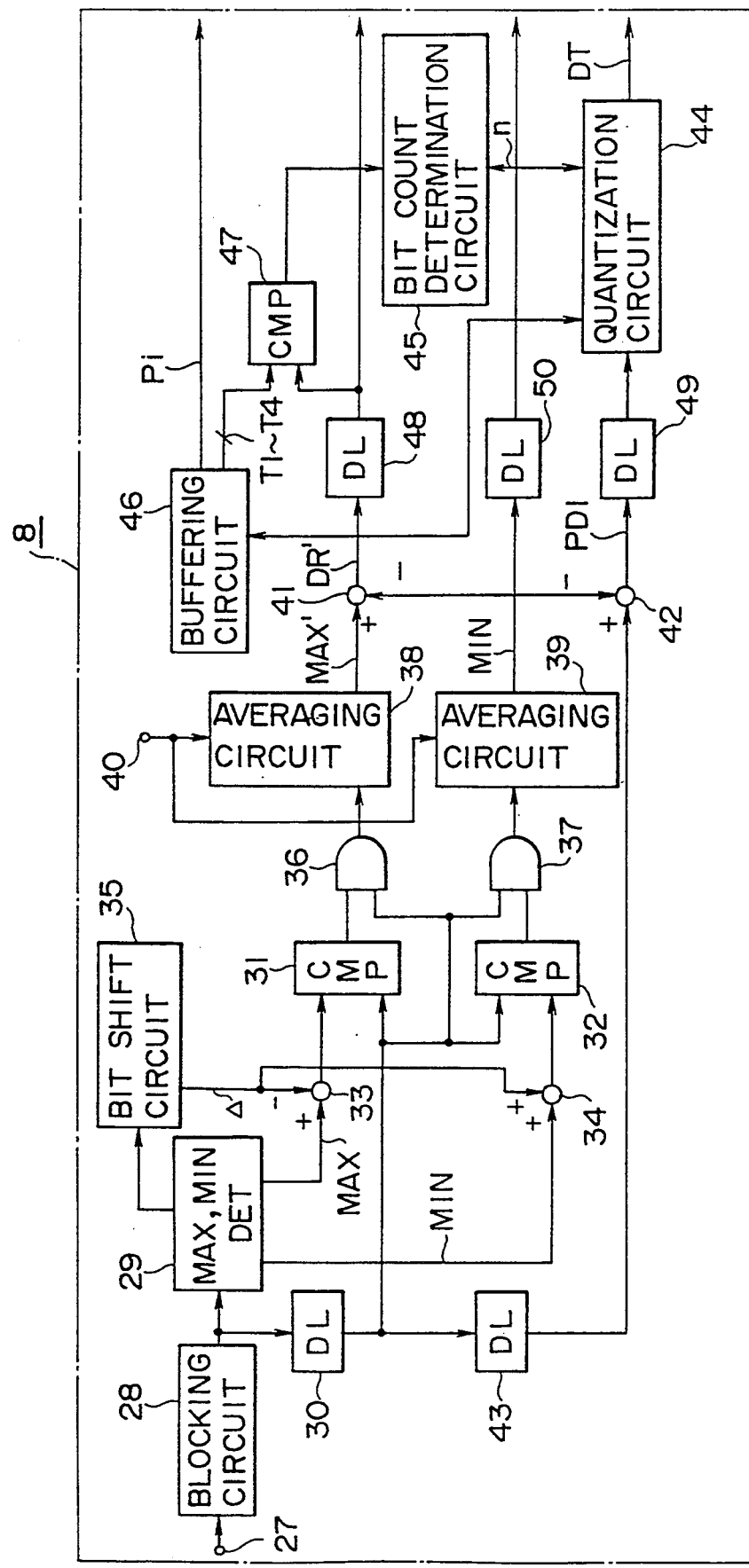
FIG. 7 is a block diagram of a typical block coding circuit for use with the invention.

Described below with reference to FIG. 7 is an example of using an ADRC encoder that does not develop picture quality deterioration in a multiple tape dubbing operation. In FIG. 7, a digital video signal (or digital color difference signal) quantized illustratively in 8 bits per sample is sent from the composition circuit 7 of FIG. 3 to an input terminal 27. The data are fed through the input terminal 27 to a blocking circuit 28. The blocked data from the blocking circuit 28 are sent to a maximum/minimum value detection circuit 29 and to a delay circuit 30. The maximum/minimum value detection circuit 29 detects a maximum and a minimum value of each block. The delay circuit 30 delays the input data by the time required to detect the maximum and minimum values. The pixel data from the delay circuit 30 are supplied to comparators 31 and 32.

The maximum value and the minimum value from the maximum/minimum value detection circuit 29 are fed to a subtracter 33 and an adder 34, respectively. A bit shift circuit 35 supplies the subtracter 33 and the adder 34 each with a quantization step width ($\Delta=1/16DR$) of a fixed four-bit length (based on non-edge matching quantization). The bit shift circuit 35 is constructed to shift 4 bits the dynamic range DR for a 1/16 division. In turn, the subtracter 33 and adder 34 produce threshold values of (MAX$-\Delta$) and (MIN$+\Delta$), respectively. The threshold values from the subtracter 33 and adder 34 are fed respectively to the comparators 31 and 32. The value $\Delta$ defining the threshold value is not limited to the quantization step width; it may be a fixed value corresponding to the noise level involved.

The output signal of the comparator 31 is sent to an AND gate 36. The AND gate 36 and another AND gate 37 are fed with data from the delay circuit 30. The output signal of the comparator 31 are brought High when the input data thereto are greater than the threshold value. This causes the output terminal of the AND gate 36 to develop those pixel data which were extracted from the input data and which fall within the maximum level range of (MAX through MAX$-\Delta$). The output signal of the comparator 32 is brought High when the input data thereto are smaller than the threshold value. This allows the output terminal of the AND gate 37 to develop those pixel data which were extracted from the input data and which fall within the minimum level range of (MIN through MIN$+\Delta$).

The output signals of the AND gales 36 and 37 are supplied to averaging circuits 38 and 39, respectively. The averaging circuits 38 and 39 are each constructed to calculate an average value for each block; they are fed with a reset signal of the block period from a terminal 40. The averaging circuit 38 produces the average value MAX' of the pixel data belonging to the maximum level range of (MAX through MAX $-\Delta$). The averaging circuit 39 provides the average value MIN' of the pixel data belonging to the minimum level range of (MIN through MIN$+\Delta$). A subtracter 41 subtracts the average value MIN' from the average value MAX' to produce a dynamic range DR'.

The average value MIN' is fed to a subtracter 42. The subtracter 42 subtracts the average value MIN' from the input data entered through a delay circuit 43, thereby producing data PDI (data minus minimum value). The data PDI and the modified dynamic range DR' are sent to a quantization circuit 44. The example discussed here is a variable length ADRC setup in which the number of bits assigned to quantization is switched to any of 0 (no code signal transmitted), 1, 2, 3 and 4 for edge matching quantization. The number of assigned bits n per block is determined by a bit count determination circuit 45. The bit count (n) data are sent to the quantization circuit 44.

The variable length ADRC encoder reduces the assigned bit count n for blocks whose dynamic range DR' is small and increases the assigned bit count n for blocks whose dynamic range DR' is large. This provides for efficient encoding. Suppose that the threshold values T1 through T4 for determining the number of bits n have the relationships of T1<T2<T3<T4. In that case, for any block wherein DR'<T1, no code signal is transferred and only the data on the dynamic range DR' are transmitted. For blocks wherein T1$\leq$DR'<T2, the bit count n is set to 1; for blocks wherein T2$\leq$DR'<T3, the bit count n is set to 2; for blocks wherein T3$\leq$DR'<T4, the bit count n is set to 3; for blocks wherein DR'$\geq$T4, the bit count n is set to 4.

With this variable length ADRC encoder, the quantity of generated data is controlled (i.e., buffering is made available) by switching appropriately the threshold values T1 through T4. This feature makes it possible to apply the above-described variable length ADRC to transmission paths such as the digital VTR of this invention wherein the quantity of generated data per field or per frame needs to be at a constant level.

A buffering circuit 46 is provided to determine the threshold values T1 through T4 for setting the quantity of generated data to a predetermined level. The buffering circuit 46 has a plurality of sets (e.g., 32) of threshold values (T1, T2, T3, T4). These sets of threshold values are distinguished from one another by use of a parameter code Pi (i=0, 1, 2, etc., 31). As the number i of the parameter code Pi increases, the quantity of generated data decreases monotonously. It should be noted that the quality of restored pictures deteriorates as the quantity of generated data decreases.

The buffering circuit 46 supplies the threshold values T1 through T4 to a comparator 47. The comparator 47 is also fed with the dynamic range DR' from a delay circuit 48. The delay circuit 48 delays the dynamic range DR' by the time required for the buffering circuit 46 to determine an appropriate set of threshold values. The comparator 47 compares the dynamic range DR' of the block with each of the threshold values. The result of the comparison is sent to the bit count determination circuit 45 whereby the assigned bit count n is determined for the block. Using the dynamic range DR' and the assigned bit count n, the quantization circuit 44 performs edge matching quantization to convert to a code signal DT the data PDI which come from a delay circuit 49 after removal of minimum values. The quantization circuit 44 may illustratively comprise a ROM.

The dynamic range DR' and the average value MIN' are output after modification through the delay circuits 48 and 50. Also output are the code signal DT and the parameter code Pi designating the set of threshold values. In this example, the signal that underwent non-edge matching quantization is subjected thereafter to edge matching quantization based on the dynamic range data. This scheme minimizes the deterioration of picture quality when the magnetic tapes are dubbed.

c. Channel Encoder and Channel Decoder

Figure 8:
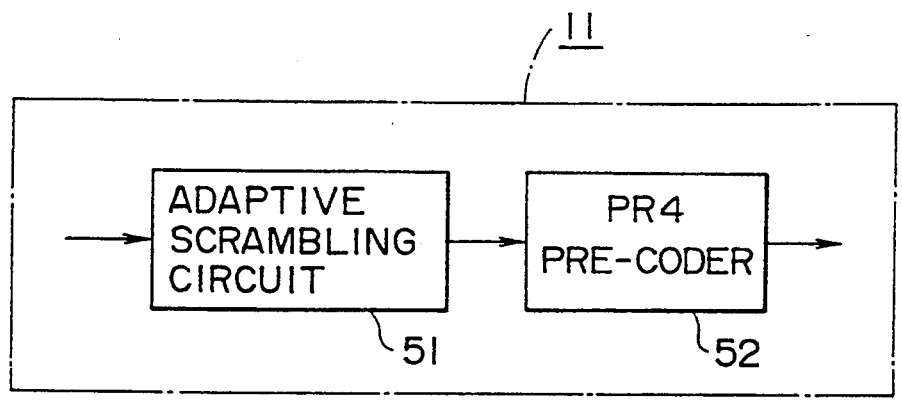
FIG. 8 is a block diagram outlining a typical channel encoder for use with the invention.

Below is a description of the channel encoder 11 of FIG. 3 and the channel decoder 15 of FIG. 4. As shown in FIG. 8, the channel encoder 11 comprises an adaptive scrambling circuit 51 providing a plurality of M period sequences. Of the M period sequences available, that one is selected which will ensure the output having the least frequency and DC components regarding the input signal. The channel encoder 11 also includes a pre-coder 52 for partial response class-4 detection. The pre-coder 52 performs $1/1-D^2$ processing (D: unit delay circuit). The output of the pre-coder 52 is sent via the recording amplifiers 12A and 12B to the magnetic heads 13A and 13B for recording or reproduction. The reproduction output is amplified by the reproducing amplifiers 14A and 14B.

Figure 9:
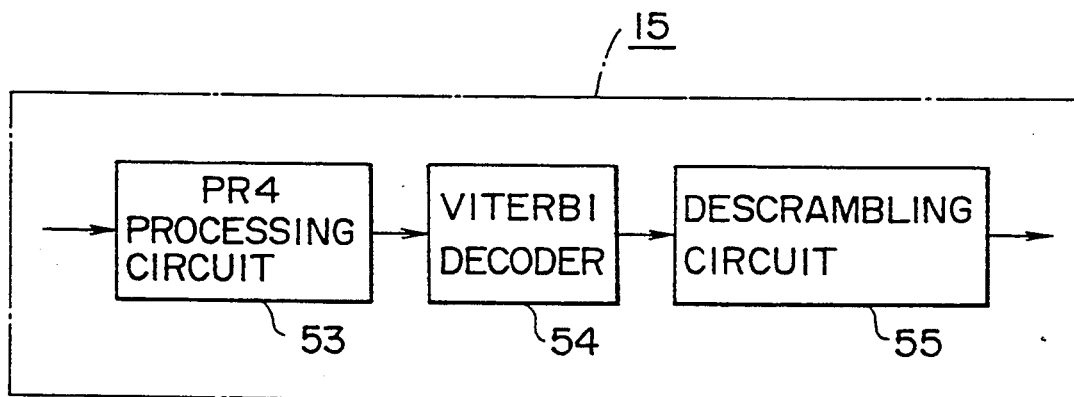
FIG. 9 is a block diagram outlining a typical channel decoder for use with the invention.

As depicted in FIG. 9, the channel decoder 15 contains a partial response class-4 processing circuit 53 on the reproduction side. The circuit 53 carries out $1+D$ processing on the output of the reproducing amplifiers 14A and 14B. Also included in the channel decoder 15 is a Viterbi decoder 54 that performs noise-resistant data decoding on the output of the processing circuit 53 on the basis of data correlation and certainty. The output of the Viterbi decoder 54 is fed to a descrambling circuit 55 also included in the channel decoder 15. The descrambling circuit 55 descrambles the data scrambled on the recording side back to the original sequence so as to restore the original data. This setup of the Viterbi decoder 54 plus the descrambling circuit 55 is superior by 3 dB in the carrier to noise ratio of reproduction to a comparative setup of the Viterbi decoder 54 alone providing bit-by-bit decoding.

d. Tape Running Section

Figure 10:
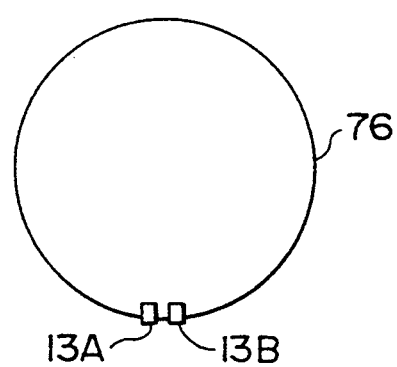
FIG. 10 is a plan view schematically showing a typical magnetic head arrangement in connection with the invention.

As shown in FIG. 10, the magnetic heads 13A and 13B are attached integrally to a drum 76. A magnetic tape, not shown, is wound obliquely around the circumference of the drum 76 at a winding angle slightly higher or lower than 180 degrees. The magnetic heads 13A and 13B are constructed so that they scan the magnetic tape simultaneously.

The azimuth angles of the magnetic heads 13A and 13B are made different from each other, as mentioned earlier. This scheme makes it possible for the magnetic heads 13A and 13B to provide a sufficiently high reproduction output while minimizing any difference in reproduction output therebetween.

Figure 11:
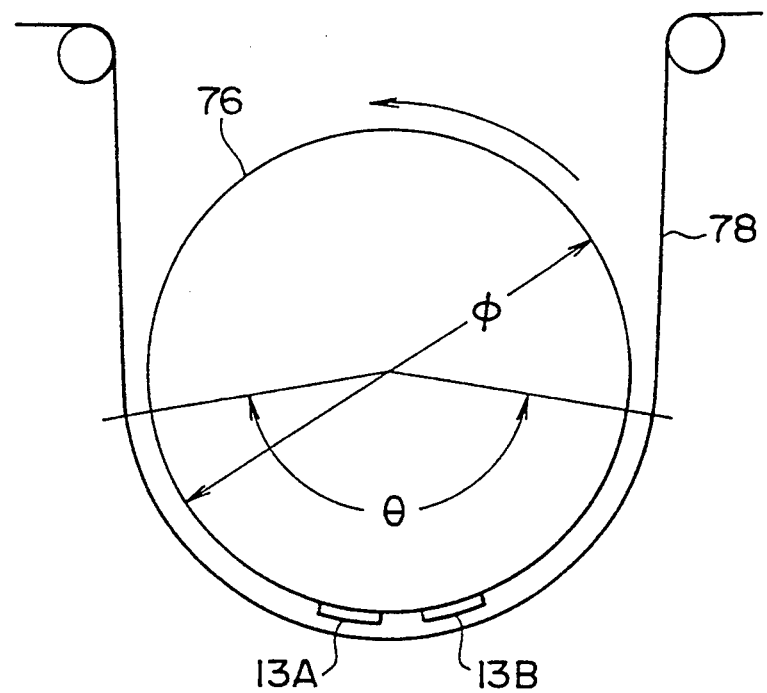
FIG. 11 is a plan view illustrating how a rotating drum is structured and how a magnetic tape is wound around it in connection with the invention.
Figure 12:
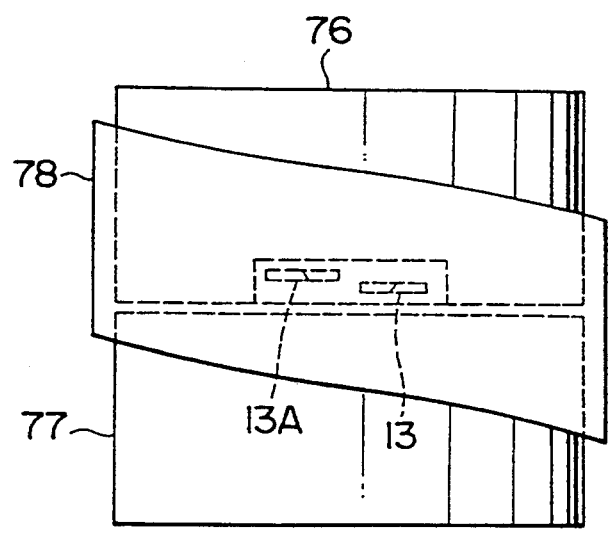
FIG. 12 is a front view depicting how a rotating drum is structured and how a magnetic tape is wound around its in connection with the invention.

FIGS. 11 and 12 illustrate more specific examples of the magnetic heads 13A and 13B integrally attached to the drum 76 (constituting the so-called double azimuth head arrangement). In one example, the magnetic heads 13A and 13B are mounted integrally on an upper drum 76 rotating at high speed while a lower drum 77 is fixed. Here, the winding angle $\theta$ of the magnetic tape 78 is 166 degrees, and the diameter $\phi$ of the drum is 16.5 mm.

In the setup above, the data of one field are segmented and recorded to five tracks on the magnetic tape 78. This segment system shortens the track lengths and thereby minimizes the incidence of errors resulting from the track linearity.

As described, the novel double azimuth head arrangement performing simultaneous recording experiences far fewer linearity-caused errors than the prior art arrangement of a pair of magnetic heads positioned at 180 degrees opposite to each other. Because the distance between the heads of the double azimuth head arrangement is short, the pairing adjustment is accomplished more accurately. Thus the tape running section as embodied above permits signal recording and reproduction using very narrow tracks.

As described and according to the invention, the direction of signal recording on the magnetic recording medium (tape) relative to the longitudinal direction of the tape is made as close to the direction of magnetic particle orientation of the tape as possible. With the double azimuth head arrangement used for recording and reproduction by helical scan, the invented scheme ensures a high reproduction output while suppressing the reproduction output difference between the two heads.

In addition, the suppression of the reproduction output difference between the two heads is conducive to preventing the deterioration in picture quality and in other characteristics. Thus the overall performance of magnetic recording and reproduction is enhanced considerably.

As many apparently different embodiments of this invention may be made without departing from the spirit and scope thereof it is to be understood that the invention is not limited to the specific embodiments thereof except as defined in the appended claims.

What is claimed is:

1. A magnetic recording and/or reproducing method for recording and/or reproducing signals on a magnetic medium by helical scan with a double azimuth head arrangement containing two heads, said magnetic medium having a coating of magnetic particles aligned in a longitudinal direction with respect to said magnetic medium, said heads scanning respective tracks inclined at an angle $\alpha$ relative to said longitudinal direction, one of said two heads having an azimuth angle of $\theta_A$ and the other of said two heads having an azimuth angle of $\theta_B$, wherein $|\theta_A| \neq |\theta_B|$, such that $|\beta_A| - |\beta_B| \leq 10°$, where $\beta_A = |\alpha + |\theta_A||$ and $\beta_B = |\alpha - |\theta_B||$.

2. A magnetic recording and/or reproducing method according to claim 1, wherein said azimuth angles of said heads are formed such that said $|\theta_A|$ and $|\theta_B|$ have respectively different angles of at most 30°.

3. A magnetic recording and/or reproducing method according to claim 1, wherein said azimuth angles of said heads are formed such that $\alpha + |\theta_A|$ and $\alpha - |\theta_B|$ are respectively different angles of at most 30°.

4. A magnetic recording and/or reproducing method according to claim 1, wherein said magnetic particles are coated on said magnetic medium by oblique evaporation.

5. Apparatus for magnetically recording and/or reproducing signals on a magnetic tape comprising: a double azimuth head arrangement containing two heads for scanning oblique tracks across said tape, the magnetic tape having a coating of magnetic particles substantially aligned in a longitudinal direction of said tape and the oblique tracks being inclined at an angle a with respect to said longitudinal direction, one of said two heads being formed with an azimuth angle $\theta_A$ and the other of said two heads being formed with an azimuth angle $\theta_B$, wherein $|\theta_A| \neq |\theta_B|$, such that $|\beta_A| - |\theta_B| \leq 10°$, where $\beta_A = |\alpha + |\theta_A||$ and $\beta_B = |\alpha - |\theta_B||$.

6. The apparatus of claim 5 wherein said azimuth angles of said heads are formed such that said $|\theta_A|$ and $|\theta_B|$ have respectively different angles of at most 30°.

7. The apparatus of claim 5 wherein said azimuth angles of said heads are formed such that $\alpha + |\theta_A|$ and $\alpha - |\theta_B|$ are respectively different angles of at most 30°.

* * * * *